(12) United States Patent
Zhang et al.

(10) Patent No.: US 8,565,153 B2
(45) Date of Patent: Oct. 22, 2013

(54) DYNAMIC SWITCHING BETWEEN MIMO AND DC HSDPA

(75) Inventors: Danlu Zhang, San Diego, CA (US);
Jilei Hou, San Diego, CA (US); Bibhu Prasad Mohanty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 12/782,492

(22) Filed: May 18, 2010

(65) Prior Publication Data

US 2010/0296446 A1  Nov. 25, 2010

Related U.S. Application Data

(60) Provisional application No. 61/179,681, filed on May 19, 2009.

(51) Int. Cl.
*H04W 4/00* (2009.01)

(52) U.S. Cl.
USPC .......................................................... 370/328

(58) Field of Classification Search
USPC .............. 370/310.2, 312, 332, 338, 328, 331, 370/329, 310, 313, 315, 330
See application file for complete search history.

(56) References Cited

U.S. PATENT DOCUMENTS

| | | | |
|---|---|---|---|
| 6,804,521 B2 * | 10/2004 | Tong et al. | 455/450 |
| 2007/0049218 A1 | 3/2007 | Gorokhov et al. | |
| 2009/0147744 A1 * | 6/2009 | Dottling et al. | 370/329 |
| 2009/0227209 A1 * | 9/2009 | Craig et al. | 455/67.13 |
| 2009/0296643 A1 * | 12/2009 | Cave et al. | 370/329 |

FOREIGN PATENT DOCUMENTS

JP  2009506729 A  2/2009

OTHER PUBLICATIONS

3GPP R1-090506, System Simulation Assumptions for Dual Carrier HSDPA and DL MIMO Performance Evaluation, Jan. 12-16, 2009, 3GPP TSG RAN WG1 Meeting #55bis, pp. 1-3.
3GPP R1-090571, System Simulation Results for Dual Carrier HSDPA and DL MIMO Operation, Feb. 10-14, 2009, 3GPP TSG-RAN WG1 #56, pp. 1-5.
3rd Generation Partnership Project; Technical Specification Group Radio Access Network; Dual-Cell HSDPA operation; (Release 8) 3GPP Standard; 3GPP TR 25.825, 3rd Generation Partnership Project (3GPP), Mobile Competence Centre ; 650, Route Des Lucioles ; F-06921 Sophia-Antipolis Cedex ; France, Nr: V1.0.0, May 1, 2008, pp. 1-67, XP050369180.
International Search Report and Written Opinion—PCT/US2010/035458, International Search Authority—European Patent Office—Sep. 21, 2010.

* cited by examiner

*Primary Examiner* — Anh Ngoc Nguyen
(74) *Attorney, Agent, or Firm* — Darren M. Simon

(57) ABSTRACT

A communication device configured for dynamic switching between Multiple-Input and Multiple-Output (MIMO) and Dual-Cell High Speed Downlink Packet Access (DC HSDPA) is disclosed. The communication device includes a processor and instructions stored in memory. The communication device begins a connection setup for one or more wireless communication devices, obtains MIMO and DC HSDPA capabilities for the one or more wireless communication devices and optimizes the coexistence of MIMO and DC HSDPA.

42 Claims, 8 Drawing Sheets

DYNAMIC SWITCHING BETWEEN MIMO AND DC HSDPA

RELATED APPLICATIONS

This application is related to and claims priority from U.S. Provisional Patent Application Ser. No. 61/179,681 filed May 19, 2009, for "Methods and Apparatus for Dynamic Switching Between MIMO and DC HSDPA."

TECHNICAL FIELD

The present disclosure relates generally to communication systems. More specifically, the present disclosure relates to dynamic switching between Multiple Input Multiple Output (MIMO) and Dual Cell High Speed Downlink Packet Access (DC HSDPA).

BACKGROUND

Wireless communication systems are widely deployed to provide various types of communication content such as voice, video, data, and so on. These systems may be multiple-access systems capable of supporting simultaneous communication of multiple terminals with one or more base stations.

As used herein, the term "mobile station" refers to an electronic device that may be used for voice and/or data communication over a wireless communication network. Examples of mobile stations include cellular phones, personal digital assistants (PDAs), handheld devices, wireless modems, laptop computers, personal computers, etc. A mobile station may alternatively be referred to as an access terminal, a mobile terminal, a subscriber station, a remote station, a user terminal, a terminal, a subscriber unit, user equipment, etc.

A wireless communication network may provide communication for a number of wireless communication devices, each of which may be serviced by a base station. A base station may alternatively be referred to as an access point, a Node B, or some other terminology.

A wireless communication device may communicate with one or more base stations via transmissions on the uplink and the downlink. The uplink (or reverse link) refers to the communication link from the mobile station to the base station, and the downlink (or forward link) refers to the communication link from the base station to the mobile station.

Benefits may be realized by improved systems and methods related to the operation of wireless communication networks implementing both MIMO and DC HSDPA.

SUMMARY

A communication device configured for dynamic switching between Multiple-Input and Multiple-Output (MIMO) and Dual-Cell High Speed Downlink Packet Access (DC HSDPA) is disclosed. The communication device includes a processor and instructions stored in memory. The communication device begins a connection setup for one or more wireless communication devices, obtains MIMO and DC HSDPA capabilities for the one or more wireless communication devices and optimizes the coexistence of MIMO and DC HSDPA.

The communication device may be a base station. The communication device may be a Node B. The communication device may be a controller. The communication device may be a Radio Network Controller (RNC). Optimizing the coexistence of MIMO and DC HSDPA may include determining an effective number of active wireless communication devices for each sector, sorting the wireless communication devices in each sector by a serving energy to total energy ratio (Ec/Io) in a last measurement report and switching wireless communication devices using DC HSDPA with higher Ec/Io to using MIMO with increased loading.

Determining the effective number of active wireless communication devices for each sector may include dividing a Radio Link Control (RLC) throughput for each wireless communication device with the serving Ec/Io, determining the wireless communication device with the largest ratio of RLC throughput to serving Ec/Io, counting the wireless communication device with the largest ratio of RLC throughput to serving Ec/Io as 1 and counting the other wireless communication devices, where the count for each wireless communication device is scaled by the RLC throughput to serving Ec/Io ratio of the wireless communication device divided by the RLC throughput to serving Ec/Io ratio of the above wireless communication device.

Optimizing the coexistence of MIMO and DC HSDPA may include determining an effective number of active wireless communication devices for each sector, sorting the wireless communication devices in each sector by a serving energy to total energy ratio (Ec/Io) in a last measurement report and switching wireless communication devices using MIMO with lower Ec/Io to using DC HSDPA.

Determining the effective number of active wireless communication devices for each sector may include dividing a Radio Link Control (RLC) throughput for each wireless communication device with the serving Ec/Io, determining the wireless communication device with the largest ratio of RLC throughput to serving Ec/Io, counting the wireless communication device with the largest ratio of RLC throughput to serving Ec/Io as 1 and counting the other wireless communication devices, where the count for each wireless communication device is scaled by the RLC throughput to serving Ec/Io ratio of the wireless communication device divided by the RLC throughput to serving Ec/Io ratio of the above wireless communication device.

Optimizing the coexistence of MIMO and DC HSDPA may include determining an effective number of active wireless communication devices for each sector, sorting wireless communication devices by an average channel quality indicator (CQI), where the average CQI for each wireless communication device is obtained from a last measurement report and sending requests to a controller to switch wireless communication devices using DC HSDPA with a higher average CQI to using MIMO with increased loading. The controller may be a Radio Network Controller (RNC).

Determining an effective number of active wireless communication devices for each sector may include counting a percentage of transmit power consumed by each wireless communication device for each transmission time interval (TTI), computing an average power utilization of each wireless communication device during each decision period, adjusting a weight for each wireless communication device in the effective number of active wireless communication devices for each sector by a resource utilization for the wireless communication device, where the wireless communication device with the largest power utilization is counted as 1 and counting all other wireless communication devices, where the weight for each wireless communication device is scaled by the power utilization of each wireless communication device.

Optimizing the coexistence of MIMO and DC HSDPA may include determining an effective number of active wireless communication devices for each sector, sorting wireless communication devices by an average channel quality indicator (CQI), where the average CQI for each wireless communication device is obtained from a last measurement report and sending requests to a controller to switch wireless communication devices using MIMO with lower average CQI to using DC HSDPA with decreased loading. The controller may be a Radio Network Controller (RNC).

Determining an effective number of active wireless communication devices for each sector may include counting a percentage of transmit power consumed by each wireless communication device for each transmission time interval (TTI), computing an average power utilization of each wireless communication device during each decision period, adjusting a weight for each wireless communication device in the effective number of active wireless communication devices for each sector by a resource utilization for the wireless communication device, where the wireless communication device with the largest power utilization is counted as 1 and counting all other wireless communication devices, where the weight for each wireless communication device is scaled by the power utilization of each wireless communication device.

A method for dynamic switching between Multiple-Input and Multiple-Output (MIMO) and Dual-Cell High Speed Downlink Packet Access (DC HSDPA) is also disclosed. The method includes beginning a connection setup for one or more wireless communication devices by a communication device. The method also includes obtaining MIMO and DC HSDPA capabilities for the one or more wireless communication devices and optimizing, by the communication device, the coexistence of MIMO and DC HSDPA.

An apparatus for dynamic switching between Multiple-Input and Multiple-Output (MIMO) and Dual-Cell High Speed Downlink Packet Access (DC HSDPA), is also disclosed. The apparatus includes means for beginning a connection setup for one or more wireless communication devices, means for obtaining MIMO and DC HSDPA capabilities for the one or more wireless communication devices and means for optimizing the coexistence of MIMO and DC HSDPA.

A computer-program product configured for dynamic switching between Multiple-Input and Multiple-Output (MIMO) and Dual-Cell High Speed Downlink Packet Access (DC HSDPA) is also disclosed. The computer-program product includes a computer-readable medium with instructions. The instructions include code for beginning a connection setup for one or more wireless communication devices, code for obtaining MIMO and DC HSDPA capabilities for the one or more wireless communication devices and code for optimizing the coexistence of MIMO and DC HSDPA.

DETAILED DESCRIPTION

As used herein, the term "base station" generally denotes a communication device that is capable of providing access to a communications network. Examples of communications networks include, but are not limited to, a telephone network (e.g., a "land-line" network such as the Public-Switched Telephone Network (PSTN) or cellular phone network), the Internet, a Local Area Network (LAN), a Wide Area Network (WAN), a Metropolitan Area Network (MAN), etc. Examples of a base station include cellular telephone base stations or nodes, access points, wireless gateways and wireless routers, for example. A base station may operate in accordance with certain industry standards, such as the Third Generation Partnership Project (3GPP), 3GPP Long Term Evolution (LTE) (e.g., where a base station may be referred to as a NodeB, evolved NodeB (eNB), etc.) and IEEE 802.16 (e.g., Worldwide Interoperability for Microwave Access or "WiMAX"). Other examples of standards that a base station may comply with may include the Institute of Electrical and Electronics Engineers (IEEE) 802.11a, 802.11b, 802.11g, 802.11n, 802.11ac (e.g., Wireless Fidelity or "Wi-Fi") standards. While some of the systems and methods disclosed herein may be described in terms of one or more standards, this should not limit the scope of the disclosure, as the systems and methods may be applicable to many systems and/or standards.

As used herein, the term "wireless communication device" generally denotes a communication device (e.g., access terminal, client device, client station, etc.) that may wirelessly connect to a base station. A wireless communication device may alternatively be referred to as a mobile device, a mobile station, a subscriber station, a user equipment (UE), a remote station, an access terminal, a mobile terminal, a terminal, a user terminal, a subscriber unit, etc. Examples of wireless communication devices include laptop or desktop computers, cellular phones, smart phones, wireless modems, e-readers, tablet devices, gaming systems, etc. Wireless communication devices may operate in accordance with one or more industry standards as described above in connection with base stations. Thus, the general term "wireless communication device" may include wireless communication devices described with varying nomenclatures according to industry standards (e.g., access terminal, user equipment (UE), remote terminal, etc.).

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

Figure 1:
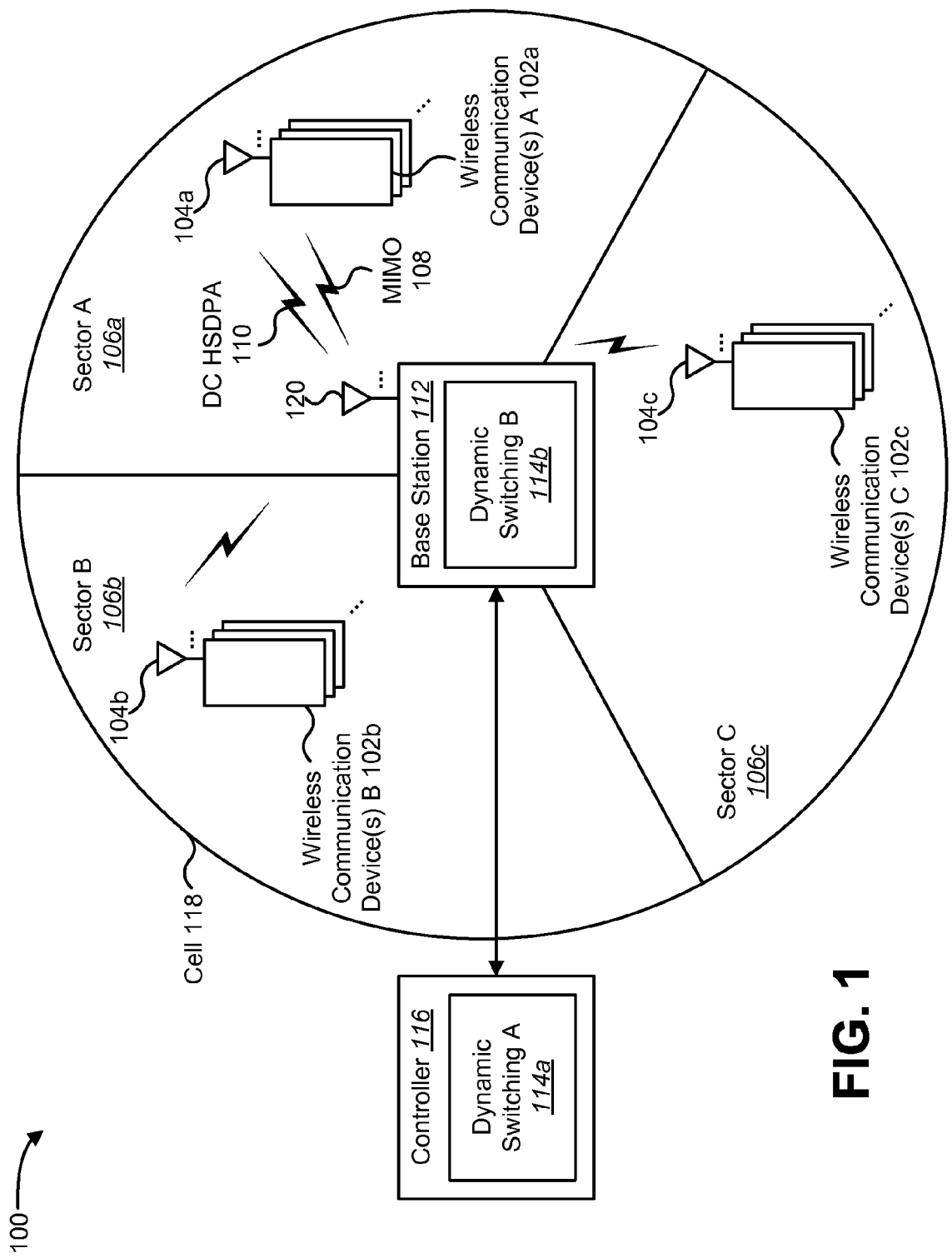
FIG. 1 is a block diagram illustrating one configuration of a wireless communication system in which systems and methods for dynamic switching between Multiple Input Multiple Output (MIMO) and Dual-Cell High Speed Downlink Packet Access (DC HSDPA) may be implemented.

FIG. 1 is a block diagram illustrating one configuration of a wireless communication system 100 in which systems and methods for dynamic switching between Multiple Input Multiple Output (MIMO) and Dual-Cell High Speed Downlink Packet Access (DC HSDPA) may be implemented. The wireless communication system 100 includes a base station 112, a controller 116 and one or more wireless communication devices 102a-c. The base station 112 transmits and/or receives wireless communication signals using one or more antennas 120. Additional base stations (not shown) may be included in the wireless communication system 100. A base station 112 may also be referred to as, and may include some or all of the functionality of, an access point, a broadcast transmitter, a Node B, an evolved Node B, etc.

In general, the base station 112 corresponds to a cell 118. The term "cell" generally refers to a particular geographic area served by the base station 112. The one or more wireless communication devices 102a-c within the cell 118 may each wirelessly communicate with the base station 112 using one or more antennas 104a-c. The cell 118 may also be divided into one or more sectors 106a-c. For example, a cell 118 may include sector A 106a, sector B 106b and sector C 106c. The base station 112 may divide and/or reuse communication resources (e.g., power, frequency, space, time, etc.) amongst the sectors 106a-c. As illustrated in FIG. 1, each sector 106a-c may include one or more wireless communication devices 104a-c. For example, one or more wireless communication devices A 102a may be located in sector A 106a, one or more wireless communication devices B 102b may be located in sector B 106b and one or more wireless communication devices C 102c may be located in sector C 106c.

The base station 112 may also communicate with a controller 116. The controller 116 may control base station 112 operation. For example, the controller 116 may schedule or assign resources (e.g., time, frequency, space, power, etc.) to the one or more wireless communication devices 102a-c. One example of a controller 116 is a Radio Network Controller (RNC) pursuant to 3GPP specifications. The base station 112 and/or the controller 116 may be referred to as a communication device. As used herein, the term "communication device" may refer to a controller 116, a base station 112, a combination of one or more controllers 116 and/or one or more base stations 112 and/or additional wireless communication system 100 structures. For example, one or more Node Bs and/or one or more RNCs may be a communication device.

A wireless communication device 102 may also be referred to as, and may include some or all of the functionality of, a terminal, an access terminal, a user equipment (UE), a subscriber unit, a station, etc. A wireless communication device 102 may be a cellular phone, a personal digital assistant (PDA), a wireless device, a wireless modem, a handheld device, a laptop computer, etc. A wireless communication device 102 may communicate with zero, one, or multiple base stations 112 on the downlink (DL) and/or uplink (UL) at any given moment. The downlink (or forward link) refers to the communication link from a base station 112 to a wireless communication device 102, and the uplink (or reverse link) refers to the communication link from a wireless communication device 102 to a base station 112.

Communication between a wireless communication device 102 in a wireless communication system 100 (e.g., a multiple-access system) and a base station 112 is occurs through transmissions over a wireless link comprised of a forward link and/or a reverse link. A wireless link may be established using a single-input and single-output (SISO), multiple-input and single-output (MISO), or a multiple-input and multiple-output (MIMO) system. A MIMO system includes one or more transmitters and one or more receivers equipped, respectively, with multiple transmit antennas and multiple receive antennas for data transmission. SISO and MISO systems are particular instances of a MIMO system. The MIMO system can provide improved performance (e.g., higher throughput, greater capacity, or improved reliability) if the additional dimensionalities created by the multiple transmit and receive antennas are utilized.

The wireless communication system 100 may utilize MIMO. At the transmitter, each portion of a data stream may be transmitted from a different antenna. At the receiver, the different portions of the data stream may be received by different antennas and then combined.

The wireless communication system 100 may be a multiple-access system capable of supporting communication with multiple wireless communication devices 102a-c by sharing the available system resources (e.g., bandwidth, transmit power, etc.). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, and spatial division multiple access (SDMA) systems.

The base station 112 may utilize MIMO and DC HSDPA. This may be done, for example, pursuant to 3GPP W-CDMA Release 8. In DC HSDPA, improved resource utilization and spectrum efficiency may be achieved by the use of joint resource allocation and load balancing across downlink carriers. The wireless communication system 100 (e.g., a 3GPP Release 8 network) may be capable of using DC HSDPA and MIMO concurrently. The one or more wireless communication devices 102a-c may be capable of receiving downlink signals from a the base station 112 using either of the two services (MIMO or DC HSDPA). However, a wireless communication device 102a-c may be incapable of using both DC HSDPA and MIMO at the same time. Thus, the controller and/or base station (e.g., a Release 8 network) may assign either MIMO services or DC HSDPA services to the one or more wireless communication devices 102a-c. In other words, each wireless communication device 102a-c may receive DC HSDPA signals 110 or MIMO signals 108 from the base station 112.

The controller 116 and/or base station 112 may use dynamic switching modules 144a-b to assign DC HSDPA service (e.g., using DC HSDPA signals 110) or MIMO service (e.g., using MIMO signals 108) to each of the wireless communication devices 102a-c. For example, it may be beneficial for a wireless communication device 102 to communicate with the base station 112 using DC HSDPA 110 when it 102 is currently communicating with the base station 112 using MIMO 108. Likewise, it may be beneficial for a wireless communication device 102 to communicate with a base station 112 using MIMO 108 when it 102 is currently communicating with the base station 112 using DC HSDPA 110. The controller 116 and/or base station 112 may follow a particular rule or procedure for service assignment. The service assignment of each wireless communication device 102 may be dynamically changed using dynamic switching module A 114a and/or dynamic switching module B 114b.

The benefits of MIMO 108 and DC HSDPA 110 may be analyzed in terms of capacity gain. The benefits of MIMO 108 and DC HSDPA 110 may additionally or alternatively be analyzed in terms of spectral efficiency improvements. As a fair comparison, 2*N wireless communication devices 102a-c may be in a sector 106a-c, with N wireless communication devices 102a-c in each carrier.

MIMO 108 may provide gain from an extra degree-of-freedom. For example, MIMO 108 may allow the use of beamforming and spatial diversity. The gain using MIMO 108 may depend on the channel types. MIMO 108 gain may be largest in a static channel with rich scattering at a high signal-to-interference noise ratio (SINR). MIMO 108 may benefit wireless communication devices 102 (e.g., UEs) close to the cell 118 center more than wireless communication devices 102 near the cell 118 edge. In MIMO 108, multiple user (e.g., wireless communication device 102) diversity may be reduced due to the spatial diversity.

DC HSDPA 110 may provide gain mainly from multiple-user (e.g., wireless communication device 102) diversity. DC HSDPA 110 gain may be largest when there is a small number of wireless communication devices 102 (e.g., UEs) present. DC HSDPA 110 gain may also be large at the cell 118 edge. When the number of wireless communication devices 102 in a sector 106 is no more than 1, DC HSDPA 110 may provide an extra degree-of-freedom and extra base station 112 power.

Simulations comparing the difference between MIMO 108 and DC HSDPA 110 may be used to show the benefits of each feature. Simulation assumptions may include the use of 19 base stations (e.g., Node Bs) with wrap around. The base stations may have an inter-site distance of 1000 meters (m). Certain channel assumptions may be made. For one kind of channel (e.g., a PA3 channel), it may be assumed that independent fading across the frequencies and antenna-pairs may occur. It may also be assumed that the orthogonal channel noise simulator (OCNS)=0, where the base station 112 (e.g., Node B) transmits with full power only when data is available. It may also be assumed that there is no extra isolation between serving and non-serving cells.

When there is a small number of wireless communication devices 102 (e.g., UEs), DC HSDPA 110 may outperform MIMO 108. For example, when the number of wireless communication devices 102 (e.g., UEs) per sector 106 is no more than 1, DC HSDPA 110 may have twice the power and bandwidth for the wireless communication device 102, thereby providing better service to the wireless communication device 102. With a large number of wireless communication devices 102, multi-user diversity may be minimal or reduced and the MIMO 108 gain may be much higher than the gain of DC HSDPA 110. The DC HSDPA 110 gain may be higher for cell 118 edge wireless communication devices 102 (e.g., UEs). Furthermore, the DC HSDPA 110 gain may decrease with the number of wireless communication devices 102 (e.g., UEs). For example, if a higher number of wireless communication devices 102 is simulated, MIMO 108 eventually outperforms DC HSDPA 110.

In a lightly loaded wireless communication system 100, there may be more wireless communication devices 102 (e.g., UEs) using DC HSDPA 110 than wireless communication devices 102 using MIMO 108. In one configuration, a lightly loaded wireless communication system 100 may include only wireless communication devices 102 (e.g., UEs) using DC HSDPA 110. As the load increases, more and more wireless communication devices 102 may be assigned to MIMO 108, beginning with the wireless communication devices 102 (e.g., UEs) at the cell 118 center. Because data traffic may be bursty in nature, the loading may be measured by the number of active wireless communication devices 102 (e.g., UEs) in a sector 106. The controller 116 (e.g., RNC) may use throughput statistics (e.g., throughput statistics of a Radio Link Control (RLC)) during a certain period and the throughput distribution among wireless communication devices 102 to measure the loading. The base station 112 and/or controller 116 (e.g., Release 8 network) may obtain the capabilities of each wireless communication device 102 for both MIMO 108 and DC HSDPA 110 during connection setup (e.g., Radio Resource Control (RRC) connection setup).

Figure 2:
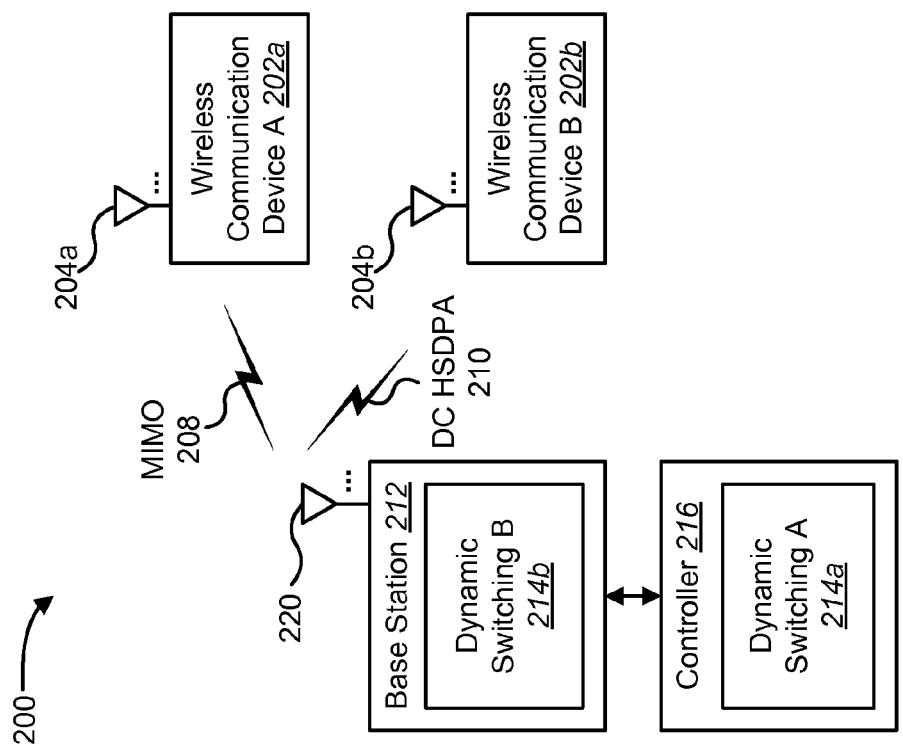
FIG. 2 is a block diagram illustrating an example of a wireless communication system.

FIG. 2 is a block diagram illustrating an example of a wireless communication system 200. The wireless communication system 200 may include a base station 212 that communicates with wireless communication device A 202a and wireless communication device B 202b using one or more antennas 220. Wireless communication device A 202a may include one or more antennas 204a and wireless communication device B 204b may also include one or more antennas 204b. In the wireless communication system 200 of FIG. 2, wireless communication device A 202a may communicate with the base station 212 using MIMO 208. Wireless communication device B 202b may communicate with the base station 212 using DC HSDPA 210. A controller 216 (e.g., RNC) may control the base station 212. For example, an RNC may control Node Bs in a Universal Mobile Telecommunications System (UMTS) radio access network (UTRAN). The controller 216 may include dynamic switching module A 214a. Alternatively or in addition, the base station 212 may include dynamic switching module B 214b. Dynamic switching module A 214a and/or dynamic switching module B 214b may be used to switch the services (e.g., MIMO 208 or DC HSDPA 210) used by the wireless communication devices 202a-b.

Figure 3:
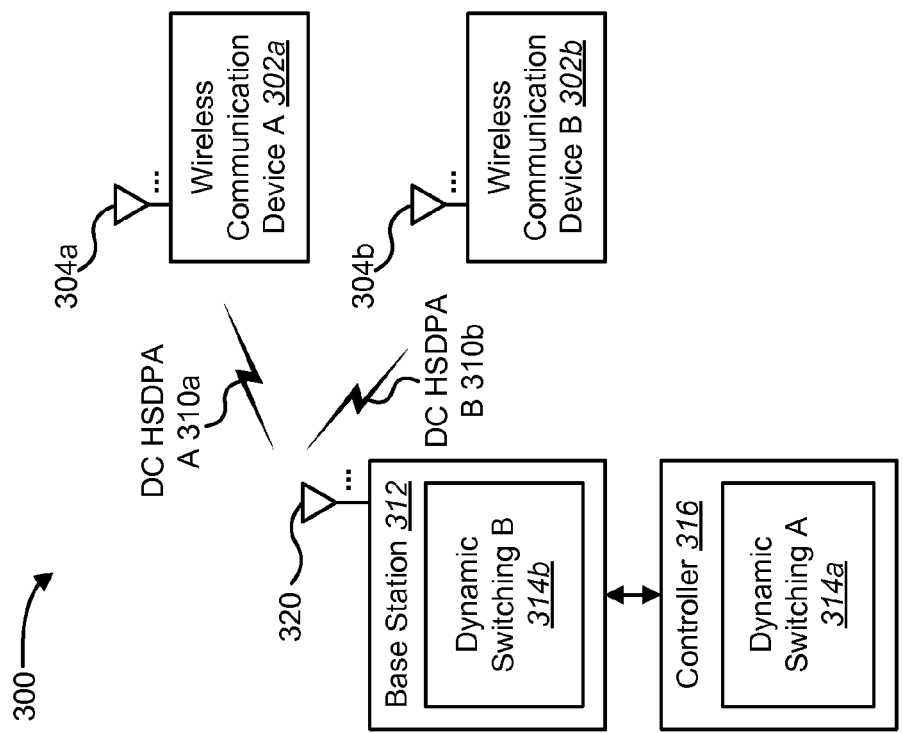
FIG. 3 is a block diagram illustrating another example of a wireless communication system.

FIG. 3 is a block diagram illustrating another example of a wireless communication system 300. The wireless communication system 300 of FIG. 3 may be the same as the wireless communication system 200 of FIG. 2 at a different time. The wireless communication system 300 may include an controller 316 (e.g., RNC), a base station 312 (e.g., Node B), wireless communication device A 302a, and wireless communication device B 302b. Wireless communication device A 302a may have previously communicated with the base station 312 (e.g., Node B) using MIMO 208 (see FIG. 2). However, the controller 316 and/or base station 312 may have assigned wireless communication device A 302a to DC HSDPA A 310a. For example, dynamic switching module A 314a may have been used by the controller 316 to switch wireless communication device A 302a from MIMO 208 to DC HSDPA A 310a. Thus, wireless communication device A 302a may currently communicate with the base station 312 using DC HSDPA A 310a. In another configuration, dynamic switching module B 314b on the base station 312 in addition to dynamic switching module A 314a on the controller 316 may have switched wireless communication device A 302a from MIMO 208 to DC HSDPA A 310a. Wireless communication device B 302b may have previously communicated with the base station 312 (e.g., Node B) using DC HSDPA 210 (see FIG. 2) and may continue to communicate with the base station 312 using DC HSDPA B 310b.

Figure 3A:
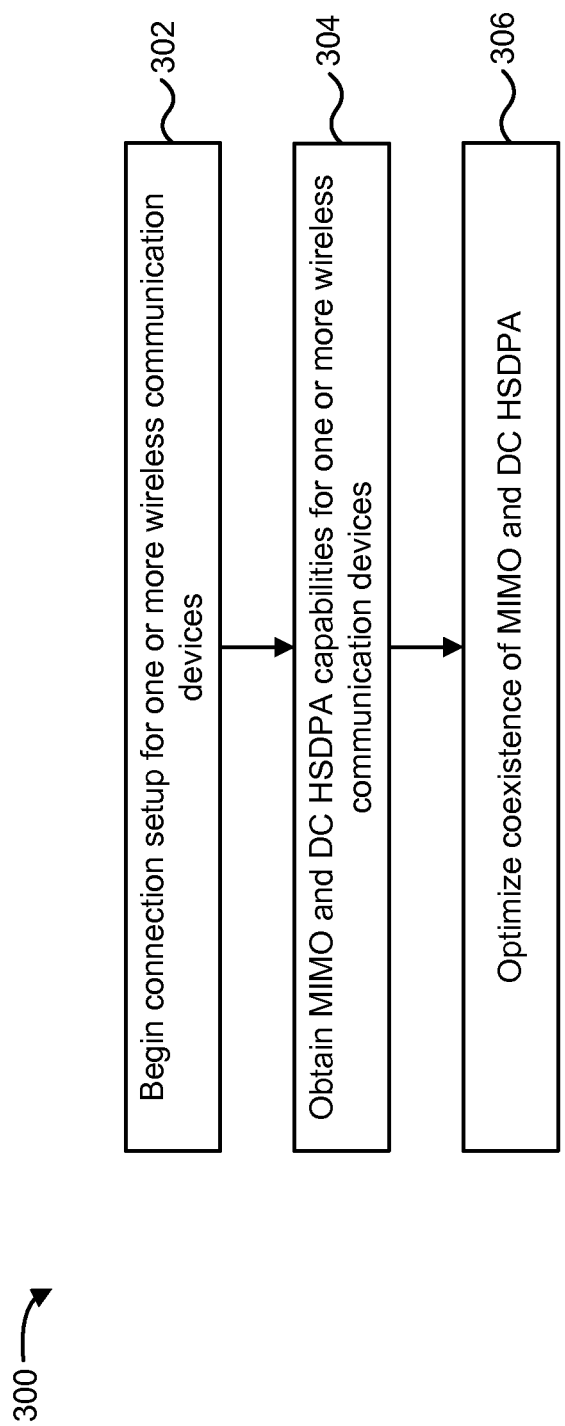
FIG. 3A is a flow diagram illustrating one configuration of a method for dynamic switching between MIMO and DC HSDPA by a controller.

FIG. 3A is a flow diagram illustrating a method 300 for dynamic switching between MIMO and DC HSDPA. The method 300 may be performed by a communication device. For example, the method 300 may be performed by a controller 116 (e.g., RNC) and/or a base station 112 (e.g., Node B). The communication device 112, 116 may begin connection setup for one or more wireless communication devices 102. For example, the controller 116 and/or base station 112 may perform a Radio Resource Control (RRC) connection setup. For instance, the base station 112 and/or controller 116 may establish a wireless connection with one or more wireless communication devices 102. This may be accomplished by sending and/or receiving messages (e.g., negotiating) between the base station 112 and one or more wireless communication devices 102.

The communication device 112, 116 may obtain MIMO and DC HSDPA capabilities for one or more wireless communication devices 102 (e.g., UEs). For example, the base station 112 and/or controller 116 may request and/or receive a message from each wireless communication device 102 indicating whether that wireless communication device is capable of receiving and/or operating with MIMO and/or DC HSDPA.

The communication device 112, 116 may optimize 306 the coexistence of MIMO 108 and DC HSDPA 110 in the wireless communication system 100. For example, the communication device 112, 116 may dynamically switch one or more wireless communication devices 102 from MIMO 108 to DC HSDPA 110 and/or from DC HSDPA 110 to MIMO 108 in an attempt to improve wireless communication system 100 performance. For example, the communication device 112, 116 may attempt to assign MIMO 108 or DC HSDPA 110 to each wireless communication device 102 as would be most beneficial (e.g., to each wireless communication device 102 and/or the wireless communication system as a whole, etc.) It should be noted that the term "optimize" does not necessarily mean that an actual optimum performance is achieved. As used herein, the term "optimize" may denote an attempt to improve wireless communication system 100 performance. Thus, optimizing and other similar terms may mean that some or no improvement in wireless communication system performance is actually achieved. Optimizing the coexistence of MIMO 108 and DC HSDPA 110 is discussed in further detail below.

Figure 4:
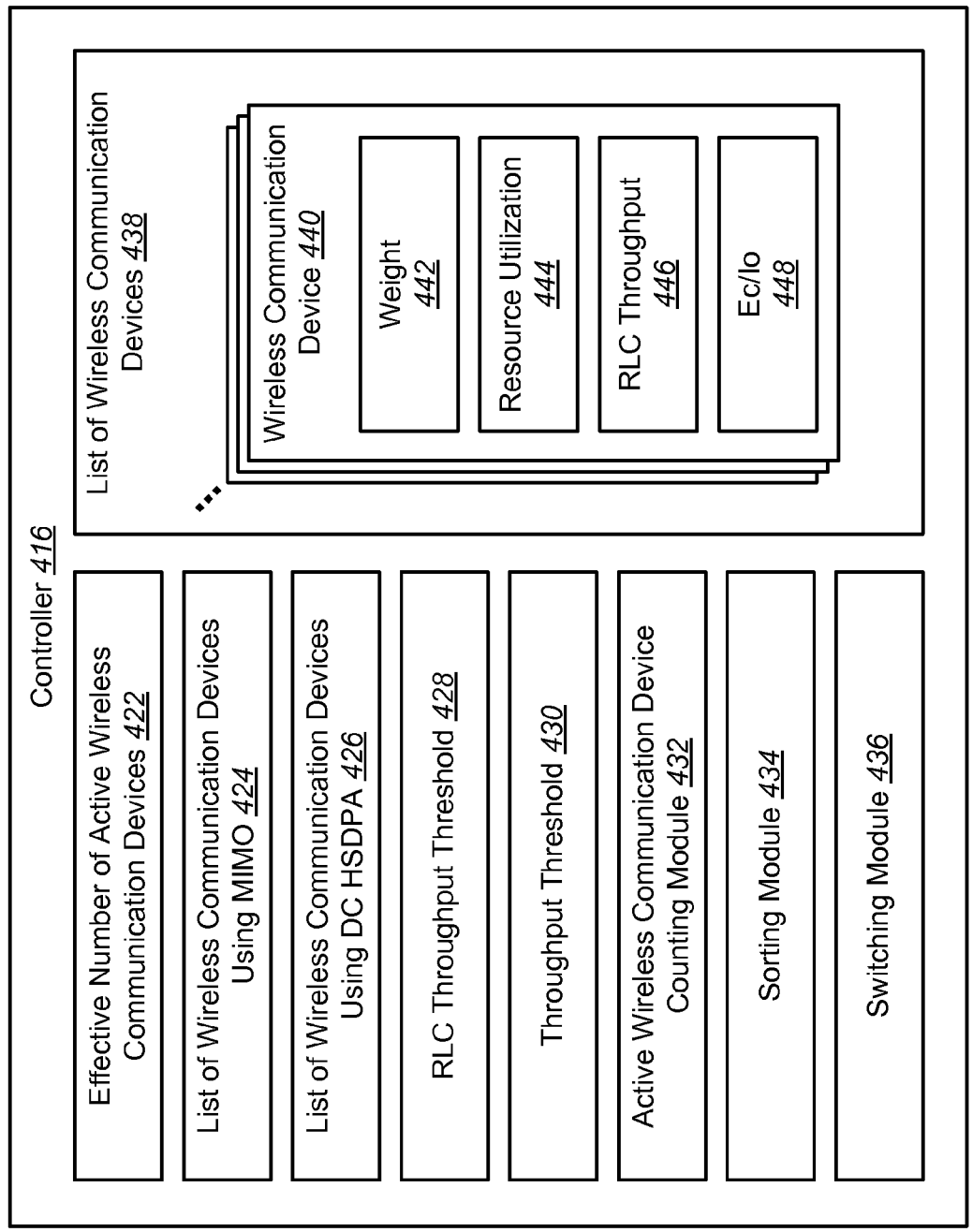
FIG. 4 is a block diagram illustrating one configuration of a controller for dynamic switching between MIMO and DC HSDPA.

FIG. 4 is a block diagram illustrating one configuration of a controller 416 for dynamic switching between MIMO 108 and DC HSDPA 110. The controller 416 may include a list 438 of wireless communication devices 440. The list 438 of wireless communication devices 440 may include a listing of the wireless communication devices 440 operating within each sector 106. The list 438 of wireless communication devices 440 may include a listing of both active and inactive wireless communication devices 440. The listing for each wireless communication device 440 may include the weight 442 for the wireless communication device 102. The weight 442 for each wireless communication device 102 may be used in a count of the effective number of active wireless communication devices 440. The weight 442 for each wireless communication device 440 may be adjusted according to the resource utilization 444 of the wireless communication device 102. The listing for each wireless communication device 440 may also include the RLC throughput 446 for the wireless communication device 102. The listing for each wireless communication device 440 may further include the energy or power (Ec) (e.g., pilot energy) to total energy or total power spectral density (Io): Ec/Io 448. It should be noted that although some measurements or factors may be described in accordance with 3GPP standards (e.g., RLC throughput, Ec/Io, etc.), similar measurements or factors may be used in other wireless communication systems. Thus, the use of such nomenclature should not limit the scope of the specification to 3GPP implementations.

The controller 416 (e.g., RNC) may include the effective number 422 of active wireless communication devices 102 for each sector 106. The controller 416 may also include a list 424 of wireless communication devices 102 currently using MIMO 108. The controller 416 may further include a list 426 of wireless communication devices 102 currently using DC HSDPA 110.

The controller 416 may include a throughput threshold 430. The throughput threshold may be based on signaling traffic throughput. The controller 416 may maintain one throughput threshold 430 for each number of active wireless communication devices 102. The throughput threshold 430 may decrease with an increasing number of wireless communication devices 102.

The controller 416 may include an active wireless communication device 102 counting module 432. The active wireless communication device 102 counting module 432 may assist the controller 416 in determining the effective number of active wireless communication devices 102. For example, only wireless communication devices 102 with a total RLC throughput 446 greater than the throughput threshold 430 may be counted. The active wireless communication devices 102 counting module 432 may divide the RLC throughput 446 for each wireless communication device 102 with the serving Ec/Io 448 available to the controller 416 (e.g., from the last measurement report). The active wireless communication devices 102 counting module 432 may then find the wireless communication device 102 with the largest ratio of RLC throughput 446 to serving Ec/Io 448. The active wireless communication devices 102 counting module 432 may then count this wireless communication device 102 as 1. Each of the other wireless communication devices 102 within the sector 106 may be scaled by the RLC throughput 446 to (Ec/Io) 448 ratio for the wireless communication device 102 divided by the RLC throughput 446 to (Ec/Io) 448 ratio of the above wireless communication device 102. A function of Ec/Io 448 may be used to better account for the wireless communication device's 102 demand for resources.

The controller 416 may also include a sorting module 434. The sorting module 434 may sort the wireless communication devices 102 in each sector 106 by the serving Ec/Io 448 in the last measurement report. The controller 416 may further include a switching module 436. The switching module may switch wireless communication devices 102 using MIMO 108 to use DC HSDPA 110 and/or switch wireless communication devices 102 using DC HSDPA 110 to MIMO 108 according to the systems and methods disclosed herein.

Figure 5:
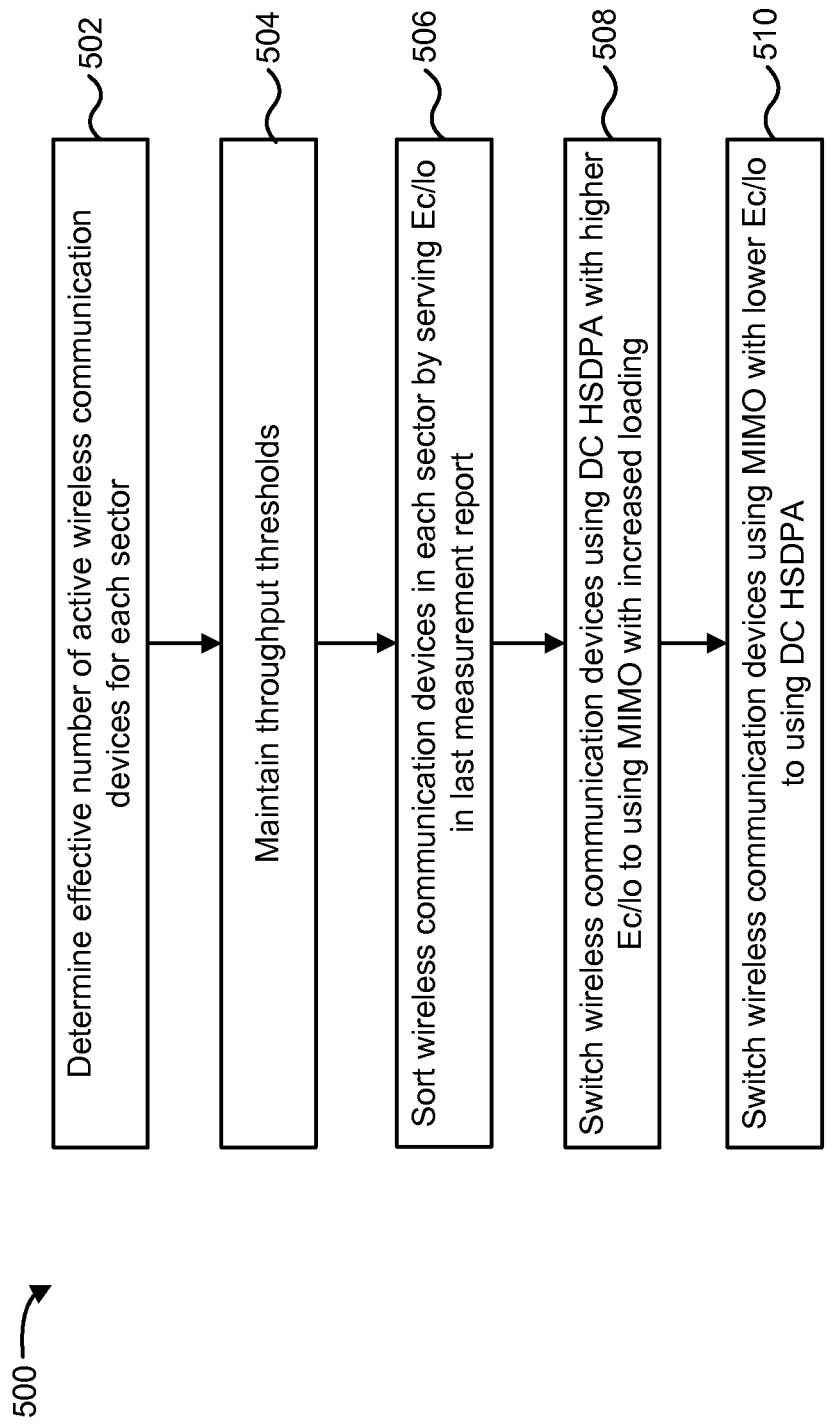
FIG. 5 is a flow diagram illustrating one configuration of a method for dynamic switching between MIMO and DC HSDPA by a controller.

FIG. 5 is a flow diagram illustrating one configuration of a method 500 for dynamic switching between MIMO 108 and DC HSDPA 110 by a controller 116. This method 500 may be performed by the controller 116 (e.g., RNC) based on existing information. The controller 116 (e.g., RNC) may determine 502 the effective number of active wireless communication devices 102 (e.g., UEs) for each sector 106. For example, only wireless communication devices with a total RLC throughput greater than a threshold is counted. The threshold may be based on signaling traffic throughput. Each wireless communication device's 102 weight in the total count may be adjusted by its resource utilization. For example, each wireless communication device's 102 throughput may be divided by its 102 serving Ec/Io available to the controller 116 (e.g., from the last measurement report). The controller 116 may determine the wireless communication device 102 with the largest ratio (e.g., throughput/(Ec/Io)) and count that wireless communication device 102 as 1. Each of the other wireless communication devices' 102 count in the total number of active users may be scaled by its 102 ratio (e.g., throughput/(Ec/Io)) to the ratio of the above wireless communication device 102. Using the function of Ec/Io in this way may better account for the wireless communication devices' 102 demand for resource.

The controller 116 may maintain 504 throughput thresholds. For example, there may be one threshold for each number of active wireless communication devices 102. This threshold may decrease with an increasing number of wireless communication devices 102.

The controller 116 may sort 506 the wireless communication devices 102 in each sector 106 by the serving Ec/Io 448 in the last measurement report. For example, each of the wireless communication devices 102 may be sorted or ranked according to the serving Ec/Io 448 received in the most recent measurement report.

The controller 116 may switch 508 wireless communication devices 102 using DC HSDPA 110 with higher Ec/Io 448 to using MIMO 108 with increased loading. The controller 116 may switch 510 wireless communication devices 102 using MIMO 108 with lower Ec/Io 448 to using DC HSDPA 110. The Ec/Io 448 percentile may be proportional to the ratio of the total throughput and the throughput threshold at the number of active wireless communication devices 102.

Figure 6:
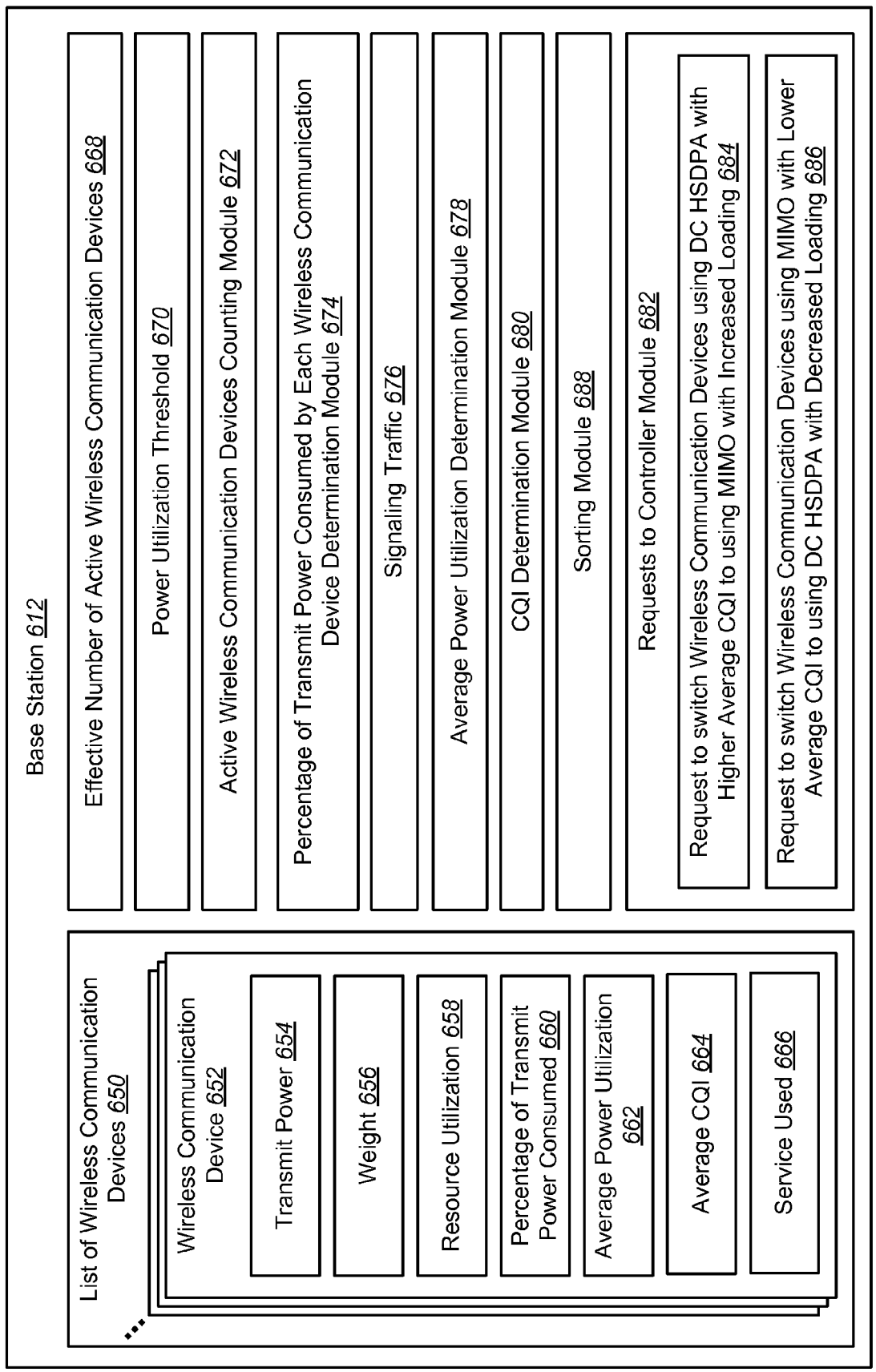
FIG. 6 is a block diagram illustrating one configuration of a base station for dynamic switching between MIMO and DC HSDPA.

FIG. 6 is a block diagram illustrating one configuration of a base station 612 for dynamic switching between MIMO 108 and DC HSDPA 110. The base station 612 may include a list 650 of wireless communication devices 102. The list 650 of wireless communication devices 102 may include a listing 652 of each wireless communication device 102 communicating with the base station 612. The list 650 of wireless communication devices 102 communicating with the base station 612 may include active and inactive wireless communication devices 102. Each listing 652 of a wireless communication device 102 may include the transmit power 654 for the wireless communication device 102, the weight 656 attributed to each wireless communication device 102 when determining the effective number of active wireless communication devices 102 and the resource utilization 658 of the wireless communication device 102. The weight 656 for each wireless communication device 102 may be adjusted according to the resource utilization 658 of the wireless communication device 102.

Each listing 652 of a wireless communication device 102 may also include the percentage of transmit power consumed 660 by the wireless communication device 102. The percentage of transmit power consumed 660 by the wireless communication device 102 may be determined using a percentage of transmit power consumed by each wireless communication device 102 determination module 672. Each listing 652 of a wireless communication device 102 may further include the average power utilization 662 by the wireless communication device 102. The average power utilization 662 by the wireless communication device 102 may be determined using an average power utilization determination module 678. Each listing 652 of the wireless communication device 102 may also include an average channel quality indicator (CQI) 664. The CQI may be determined using a CQI determination module 680. Each listing 652 of the wireless communication device 102 may further include the service used 666. The service used 666 may indicate whether the wireless communication device 102 is currently communicating with the base station 612 using MIMO 108 or DC HSDPA 110.

The base station 612 may include the effective number 668 of active wireless communication devices 102 for each sector 106. The effective number 668 of active wireless communication devices 102 may be determined by an active wireless communication devices 102 counting module 672. For each transmission time interval (TTI), the active wireless communication devices 102 counting module 672 may count the percentage of transmit power consumed 660 by each wireless communication device 102. The active wireless communication devices 102 counting module 672 may then compute the average power utilization 662 of each wireless communication device 102 during each decision period. Only wireless communication devices 102 with average power utilization 662 higher than a power utilization threshold may be counted. The power utilization threshold may be based on signaling traffic. The active wireless communication devices 102 counting module 672 may adjust the weight 656 for each wireless communication device 102 in the effective number 668 of active wireless communication devices 102 by the resource utilization 658 for the wireless communication device 102. For example, the active wireless communication devices 102 counting module 672 may find the wireless communication device 102 with the largest power utilization and count this wireless communication device 102 as 1. All other wireless communication devices 102 in the total number of active wireless communication devices 102 may then be scaled down by the power utilization of each wireless communication device 102.

The base station 612 may include a sorting module 688. The sorting module 688 may sort each of the wireless communication devices 102 according to the average CQI 664 from the last measurement report. For wireless communication devices 102 where the service used is MIMO 108, the CQI may be the sum of the two streams. For wireless communication devices 102 where the service used is DC HSDPA 110, the CQI may be the average over the two carriers.

The base station 612 may also include a requests to controller 116 module 682. The requests to controller module 682 may generate and send requests to the controller 116 (e.g., RNC) concerning the service used by each wireless communication device 102. For example, the requests to controller module 682 may generate a request to move DC HSDPA 110 wireless communication devices 102 with higher average CQIs to MIMO 108 with increased loading. The requests to controller module 682 may then send the request to the controller 116. The requests to controller module 682 may also generate a request to move MIMO 108 wireless communication devices 102 with lower average CQIs to DC HSDPA 110 with decreased loading. The requests to controller module 682 may then send the request to the controller 116.

Figure 7:
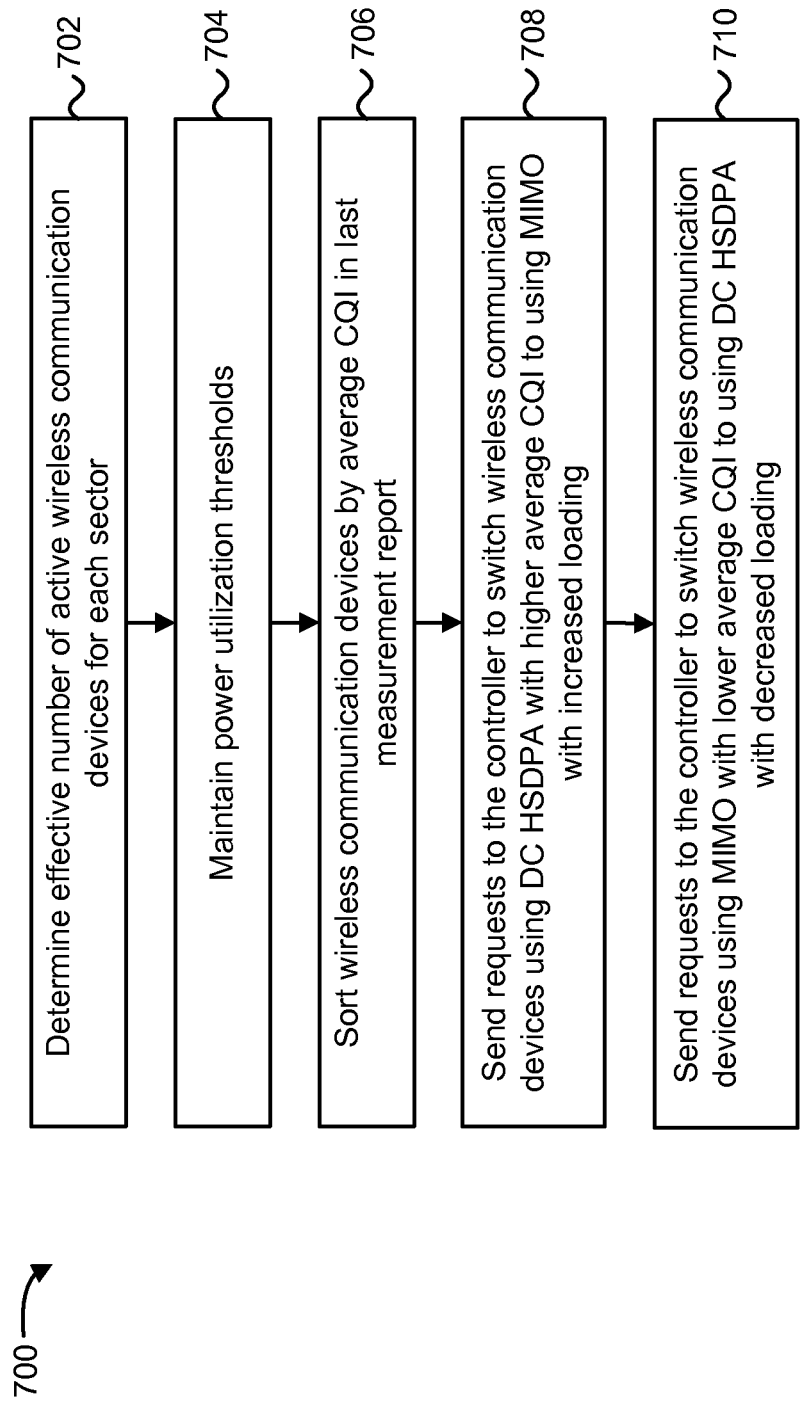
FIG. 7 is a flow diagram illustrating another configuration of a method for dynamic switching between MIMO and DC HSDPA by a base station and a controller.

FIG. 7 is a flow diagram illustrating another configuration of a method 700 for dynamic switching between MIMO 108 and DC HSDPA 110 by a base station 112 and a controller 116. The method 700 illustrated in FIG. 7 may perform better than the controller-only method 500 illustrated in FIG. 5. However, the method 700 of FIG. 7 may require new signaling between the base station 112 and the controller 116 for requests and decisions.

The base station 112 (e.g., Node B) may determine 702 the effective number of active wireless communication devices 102 for each sector 106. For example, for each Transmission Time Interval (TTI), the base station 112 (e.g., Node B) counts the percentage of transmit power consumed by each wireless communication device 102. The base station 112 may also compute the average power utilization of each wireless communication device during each decision period. Only the wireless communication devices with an average power utilization higher than a threshold may be counted. The threshold may be based on signaling traffic. Each wireless communication devices' weight in the total count may be adjusted by its resources utilization. For example, the base station 112 may determine the wireless communication device 102 with the largest power utilization and count that wireless communication device 102 as 1. Each of the other wireless communication devices' 102 count in the total number of active users may be scaled by its power utilization.

The base station 112 may maintain 704 power utilization thresholds. For example, there may be one threshold for each number of active wireless communication devices 102. This threshold may decrease with an increasing number of wireless communication devices 102.

The base station 112 may sort 706 the wireless communication devices 102 by the average CQI in the last measurement report. For wireless communication devices 102 that are currently using MIMO 108, the CQI may be the sum of the two streams. For wireless communication devices 102 that are currently using DC HSDPA 110, the CQI may be the average over the two carriers. For example, the base station 112 may rank or sort 706 each wireless communication device 102 based on its CQI.

The base station 112 may then send 708 requests to the controller 116 to switch wireless communication devices 102 using DC HSDPA 110 with higher average CQIs to using MIMO 108 with increased loading. The base station 112 may also send 710 requests to the controller 116 to switch wireless communication devices 102 using MIMO 108 with lower average CQIs to use DC HSDPA 110 with decreased loading. The CQI percentile may be proportional to the ratio of the total power utilization and the threshold on the total power utilization at the number of active wireless communication devices.

Figure 8:
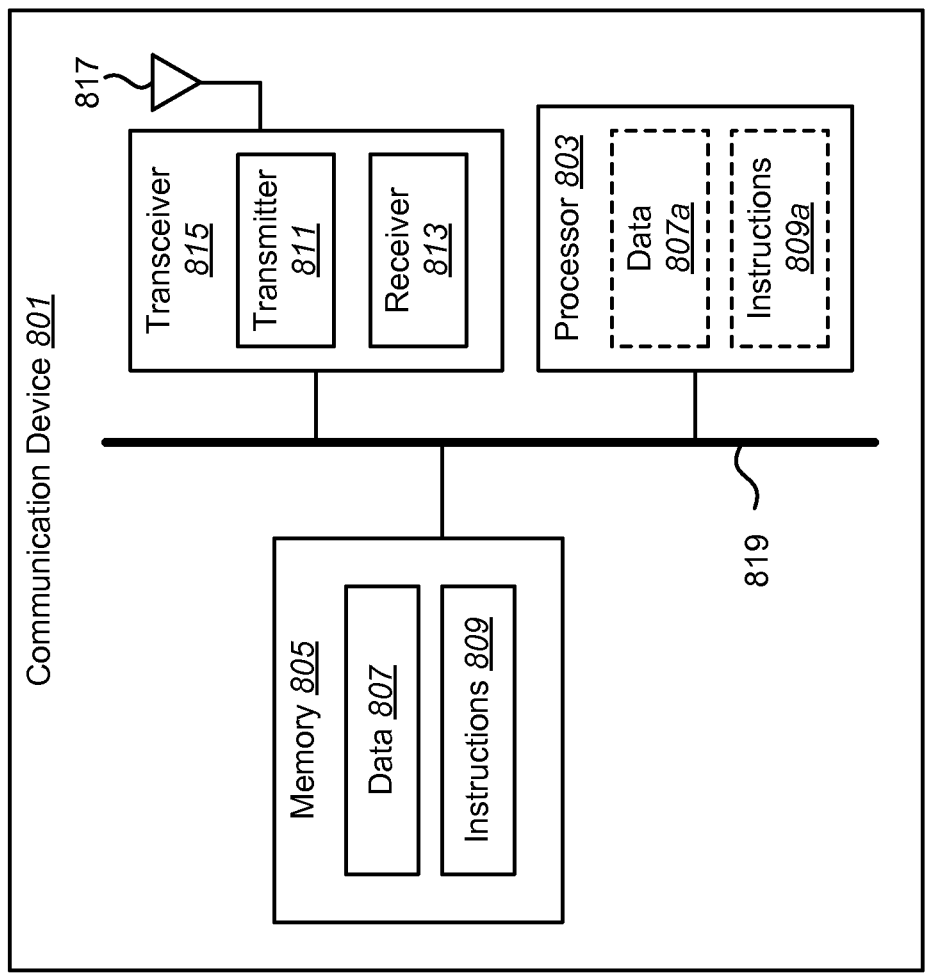
FIG. 8 illustrates certain components that may be included within a communication device.

FIG. 8 illustrates certain components that may be included within a communication device 801. The communication device 801 may be a base station 112 (e.g., Node B) or a controller 116 (e.g., RNC).

The communication device 801 includes a processor 803. The processor 803 may be a general purpose single- or multi-chip microprocessor (e.g., an ARM), a special purpose microprocessor (e.g., a digital signal processor (DSP)), a microcontroller, a programmable gate array, etc. The processor 803 may be referred to as a central processing unit (CPU). Although just a single processor 803 is shown in the communication device 801 of FIG. 8, in an alternative configuration, a combination of processors (e.g., an ARM and DSP) could be used.

The communication device 801 also includes memory 805. The memory 805 may be any electronic component capable of storing electronic information. The memory 805 may be embodied as random access memory (RAM), read only memory (ROM), magnetic disk storage media, optical storage media, flash memory devices in RAM, on-board memory included with the processor, EPROM memory, EEPROM memory, registers, and so forth, including combinations thereof.

Data 807 and instructions 809 may be stored in the memory 805. The instructions 809 may be executable by the processor 803 to implement the methods disclosed herein. Executing the instructions 809 may involve the use of the data 807 that is stored in the memory 805. When the processor 803 executes the instructions 807, various portions of the instructions 807a may be loaded onto the processor 803, and various pieces of data 809a may be loaded onto the processor 803.

The communication device 801 may also include a transmitter 811 and a receiver 813 to allow transmission and reception of signals to and from the communication device 801. The transmitter 811 and receiver 813 may be collectively referred to as a transceiver 815. An antenna 817 may be electrically coupled to the transceiver 815. The communication device 801 may also include (not shown) multiple transmitters, multiple receivers, multiple transceivers and/or multiple antenna.

The various components of the communication device 801 may be coupled together by one or more buses, which may include a power bus, a control signal bus, a status signal bus, a data bus, etc. For the sake of clarity, the various buses are illustrated in FIG. 8 as a bus system 819.

The techniques described herein may be used for various communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIGS. 3, 5 and 7, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A communication device configured for dynamic switching between Multiple-Input and Multiple-Output (MIMO) and Dual-Cell High Speed Downlink Packet Access (DC HSDPA), comprising:
   a processor;
   memory in electronic communication with the processor;
   instructions stored in the memory, the instructions being executable by the processor to:
      begin a connection setup for one or more wireless communication devices;
      obtain MIMO and DC HSDPA capabilities for the one or more wireless communication devices;
      determine an effective number of active wireless communication devices for each sector;
      sort the wireless communication devices in each sector by a factor indicated in a last measurement report, wherein the factor includes at least a serving energy to total energy ratio (Ec/Io); and
      switch between MIMO and DC HSDPA based on the sorting.

2. The communication device of claim 1, wherein the communication device is a base station.

3. The communication device of claim 1, wherein the communication device is a Node B.

4. The communication device of claim 1, wherein the communication device is a controller.

5. The communication device of claim 1, wherein the communication device is a Radio Network Controller (RNC).

6. The communication device of claim 5, wherein switching between MIMO and DC HSDPA comprises switching wireless communication devices using DC HSDPA with higher Ec/Io to using MIMO with increased loading.

7. The communication device of claim 6, wherein determining the effective number of active wireless communication devices for each sector comprises:
   dividing a Radio Link Control (RLC) throughput for each wireless communication device with the serving Ec/Io;
   determining the wireless communication device with a largest ratio of RLC throughput to serving Ec/Io;
   counting the wireless communication device with the largest ratio of RLC throughput to serving Ec/Io as 1; and
   counting the other wireless communication devices, wherein the count for each wireless communication device is scaled by the RLC throughput to serving Ec/Io ratio of the wireless communication device divided by the RLC throughput to serving Ec/Io ratio of the above wireless communication device.

8. The communication device of claim 5, wherein switching between MIMO and DC HSDPA comprises switching wireless communication devices using MIMO with lower Ec/Io to using DC HSDPA.

9. The communication device of claim 8, wherein determining the effective number of active wireless communication devices for each sector comprises:
   dividing a Radio Link Control (RLC) throughput for each wireless communication device with the serving Ec/Io;
   determining the wireless communication device with a largest ratio of RLC throughput to serving Ec/Io;
   counting the wireless communication device with the largest ratio of RLC throughput to serving Ec/Io as 1; and
   counting the other wireless communication devices, wherein the count for each wireless communication device is scaled by the RLC throughput to serving Ec/Io ratio of the wireless communication device divided by the RLC throughput to serving Ec/Io ratio of the above wireless communication device.

10. The communication device of claim 2, wherein switching between MIMO and DC HSDPA comprises sending requests to a controller to switch wireless communication devices using DC HSDPA with a higher average CQI to using MIMO with increased loading.

11. The communication device of claim 10, wherein the controller is a Radio Network Controller (RNC).

12. The communication device of claim 10, wherein determining an effective number of active wireless communication devices for each sector comprises:
   counting a percentage of transmit power consumed by each wireless communication device for each transmission time interval (TTI);
   computing an average power utilization of each wireless communication device during each decision period;
   adjusting a weight for each wireless communication device in the effective number of active wireless communication devices for each sector by a resource utilization for the wireless communication device, wherein the wireless communication device with the largest power utilization is counted as 1; and counting all other wireless communication devices, wherein the weight for each wireless communication device is scaled by the power utilization of each wireless communication device.

13. The communication device of claim 2, wherein switching between MIMO and DC HSDPA comprises sending requests to a controller to switch wireless communication devices using MIMO with lower average CQI to using DC HSDPA with decreased loading.

14. The communication device of claim 13, wherein the controller is a Radio Network Controller (RNC).

15. The communication device of claim 13, wherein determining an effective number of active wireless communication devices for each sector comprises:
- counting a percentage of transmit power consumed by each wireless communication device for each transmission time interval (TTI);
- computing an average power utilization of each wireless communication device during each decision period;
- adjusting a weight for each wireless communication device in the effective number of active wireless communication devices for each sector by a resource utilization for the wireless communication device, wherein the wireless communication device with the largest power utilization is counted as 1; and
- counting all other wireless communication devices, wherein the weight for each wireless communication device is scaled by the power utilization of each wireless communication device.

16. A method for dynamic switching between Multiple-Input and Multiple-Output (MIMO) and Dual-Cell High Speed Downlink Packet Access (DC HSDPA), comprising:
- beginning, by a communication device, a connection setup for one or more wireless communication devices;
- obtaining, by the communication device, MIMO and DC HSDPA capabilities for the one or more wireless communication devices; determining an effective number of active wireless communication devices for each sector;
- sorting the wireless communication devices in each sector by a factor indicated in a last measurement report, wherein the factor includes at least a serving energy to total energy ratio (Ec/Io); and
- switching between MIMO and DC HSDPA based on the sorting.

17. The method of claim 16, wherein the communication device is a base station.

18. The method of claim 16, wherein the communication device is a Node B.

19. The method of claim 16, wherein the communication device is a controller.

20. The method of claim 16, wherein the communication device is a Radio Network Controller (RNC).

21. The method of claim 20, wherein switching between MIMO and DC HSDPA comprises switching wireless communication devices using DC HSDPA with higher Ec/Io to using MIMO with increased loading.

22. The method of claim 21, wherein determining the effective number of active wireless communication devices for each sector comprises:
- dividing a Radio Link Control (RLC) throughput for each wireless communication device with the serving Ec/Io;
- determining the wireless communication device with a largest ratio of RLC throughput to serving Ec/Io;
- counting the wireless communication device with the largest ratio of RLC throughput to serving Ec/Io as 1; and
- counting the other wireless communication devices, wherein the count for each wireless communication device is scaled by the RLC throughput to serving Ec/Io ratio of the wireless communication device divided by the RLC throughput to serving Ec/Io ratio of the above wireless communication device.

23. The method of claim 20, wherein switching between MIMO and DC HSDPA comprises switching wireless communication devices using MIMO with lower Ec/Io to using DC HSDPA.

24. The method of claim 23, wherein determining the effective number of active wireless communication devices for each sector comprises:
- dividing a Radio Link Control (RLC) throughput for each wireless communication device with the serving Ec/Io;
- determining the wireless communication device with a largest ratio of RLC throughput to serving Ec/Io;
- counting the wireless communication device with the largest ratio of RLC throughput to serving Ec/Io as 1; and
- counting the other wireless communication devices, wherein the count for each wireless communication device is scaled by the RLC throughput to serving Ec/Io ratio of the wireless communication device divided by the RLC throughput to serving Ec/Io ratio of the above wireless communication device.

25. The method of claim 17, wherein switching between MIMO and DC HSDPA comprises sending requests to a controller to switch wireless communication devices using DC HSDPA with a higher average CQI to using MIMO with increased loading.

26. The method of claim 25, wherein the controller is a Radio Network Controller (RNC).

27. The method of claim 25, wherein determining an effective number of active wireless communication devices for each sector comprises:
- counting a percentage of transmit power consumed by each wireless communication device for each transmission time interval (TTI);
- computing an average power utilization of each wireless communication device during each decision period;
- adjusting a weight for each wireless communication device in the effective number of active wireless communication devices for each sector by a resource utilization for the wireless communication device, wherein the wireless communication device with the largest power utilization is counted as 1; and
- counting all other wireless communication devices, wherein the weight for each wireless communication device is scaled by the power utilization of each wireless communication device.

28. The method of claim 17, wherein switching between MIMO and DC HSDPA comprises sending requests to a controller to switch wireless communication devices using MIMO with lower average CQI to using DC HSDPA with decreased loading.

29. The method of claim 28, wherein the controller is a Radio Network Controller (RNC).

30. The method of claim 28, wherein determining an effective number of active wireless communication devices for each sector comprises:
- counting a percentage of transmit power consumed by each wireless communication device for each transmission time interval (TTI);
- computing an average power utilization of each wireless communication device during each decision period;
- adjusting a weight for each wireless communication device in the effective number of active wireless communication devices for each sector by a resource utilization for the wireless communication device, wherein the wireless communication device with the largest power utilization is counted as 1; and counting all other wireless communication devices, wherein the weight for each wireless communication device is scaled by the power utilization of each wireless communication device.

31. An apparatus for dynamic switching between Multiple-Input and Multiple-Output (MIMO) and Dual-Cell High Speed Downlink Packet Access (DC HSDPA), comprising:

means for beginning a connection setup for one or more wireless communication devices;

means for obtaining MIMO and DC HSDPA capabilities for the one or more wireless communication devices;

means for determining an effective number of active wireless communication devices for each sector;

means for sorting the wireless communication devices in each sector by a factor indicated in a last measurement report, wherein the factor includes at least a serving energy to total energy ratio (Ec/Io); and means for switching between MIMO and DC HSDPA based on the sorting.

32. The apparatus of claim 31, wherein the apparatus is a base station.

33. The method of claim 31, wherein the apparatus is a controller.

34. The apparatus of claim 33, wherein the means for switching between MIMO and DC HSDPA comprises means for switching wireless communication devices using DC HSDPA with higher Ec/Io to using MIMO with increased loading.

35. The apparatus of claim 33, wherein the means for switching between MIMO and DC HSDPA comprises means for switching wireless communication devices using MIMO with lower Ec/Io to using DC HSDPA.

36. The apparatus of claim 32, wherein the means for switching between MIMO and DC HSDPA comprises means for sending requests to a controller to switch wireless communication devices using DC HSDPA with a higher average CQI to using MIMO with increased loading.

37. The apparatus of claim 32, wherein the means for switching between MIMO and DC HSDPA comprises means for sending requests to a controller to switch wireless communication devices using MIMO with lower average CQI to using DC HSDPA with decreased loading.

38. A computer-program product configured for dynamic switching between Multiple-Input and Multiple-Output (MIMO) and Dual-Cell High Speed Downlink Packet Access (DC HSDPA), the computer-program product comprising a non-transitory computer-readable medium having instructions thereon, the instructions comprising:

code for beginning a connection setup for one or more wireless communication devices;

code for obtaining MIMO and DC HSDPA capabilities for the one or more wireless communication devices;

code for determining an effective number of active wireless communication devices for each sector;

code for sorting the wireless communication devices in each sector by a factor indicated in a last measurement report, wherein the factor includes at least a serving energy to total energy ratio (Ec/Io); and code for switching between MIMO and DC HSDPA based on the sorting.

39. The computer-program product of claim 38, wherein the code for switching between MIMO and DC HSDPA comprises code for switching wireless communication devices using DC HSDPA with higher Ec/Io to using MIMO with increased loading.

40. The computer-program product of claim 38, wherein the code for switching between MIMO and DC HSDPA comprises code for switching wireless communication devices using MIMO with lower Ec/Io to using DC HSDPA.

41. The computer-program product of claim 38, wherein the code for switching between MIMO and DC HSDPA comprises code for sending requests to a controller to switch wireless communication devices using DC HSDPA with a higher average CQI to using MIMO with increased loading.

42. The computer-program product of claim 38, wherein the code for switching comprises code for sending requests to a controller to switch wireless communication devices using MIMO with lower average CQI to using DC HSDPA with decreased loading.

* * * * *